United States Patent [19]

Huddle

[11] E Re. 30,044

[45] Reissued Jul. 17, 1979

[54] VERTICAL ARCH SHELTER

[75] Inventor: Carl F. Huddle, Pleasant Ridge, Mich.

[73] Assignee: Tension Structures Company, Pleasant Ridge, Mich.

[21] Appl. No.: 908,518

[22] Filed: May 22, 1978

Related U.S. Patent Documents

Reissue of:

[64] Patent No.: 4,036,244
Issued: Jul. 19, 1977
Appl. No.: 576,101
Filed: Jun. 12, 1975

U.S. Applications:

[63] Continuation-in-part of Ser. No. 339,333, May 8, 1973, abandoned, which is a continuation-in-part of Ser. No. 93,293, Nov. 27, 1970, abandoned.

[51] Int. Cl.[2] ..... A45F 1/16; E04B 1/32

[52] U.S. Cl. ..... 135/4 R; 52/86; 135/DIG. 1

[58] Field of Search ..... 135/4 R, DIG. 1; 52/86

[56] References Cited

U.S. PATENT DOCUMENTS

| | | | |
|---|---|---|---|
| 2,615,458 | 10/1952 | Jones | 135/1 A |
| 2,797,696 | 7/1957 | Fritshe | 135/1 R |
| 3,215,153 | 11/1965 | Huddle | 135/4 R |
| 3,240,217 | 3/1966 | Bird et al. | 52/86 |
| 3,273,574 | 9/1966 | Huddle | 135/4 R |

*Primary Examiner*—C. J. Husar
*Assistant Examiner*—Conrad L. Berman

[57] ABSTRACT

A vaulted membrane structure that has a series of substantially curved vertical arches that can be arranged in a modular construction to support a flexible membrane that is attached to the arches and tensioned between them in a formed inward depression to minimize vibration and flutter and to increase its ability to withstand heavy live loads such as snow or pulsating loads created by high winds.

This construction applies particularly to comparative small shelters where the membrane can slide in its fastener on the arch, or slide along the arch to stretch the membrane over the arches when it is fabricated in one piece or in multiple sections.

The membrane is tensioned in several ways: by pulling the membrane towards the base or by pulling the arches apart by anchor lines and/or by end closures that are fastened to the base, or by adjustable purlins or jacks between arches to force them apart. A combination of two ways is also used. The arches are fixed apart by compression members between them or by anchor lines to the base. Tension rings along the base can be used to urge the membrane downward between arches and to provide openings under them for shelter ventilation.

Safety cables between arches are optional but can prevent collapse of the shelter in case of membrane failure.

15 Claims, 13 Drawing Figures

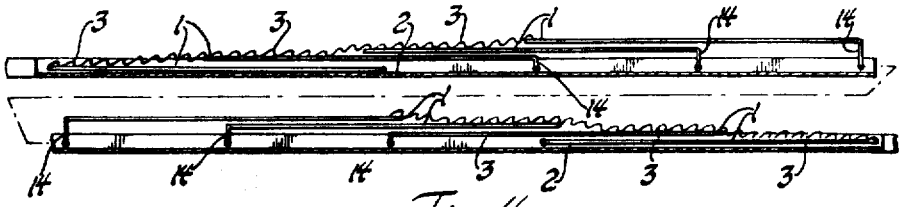
Fig. 4
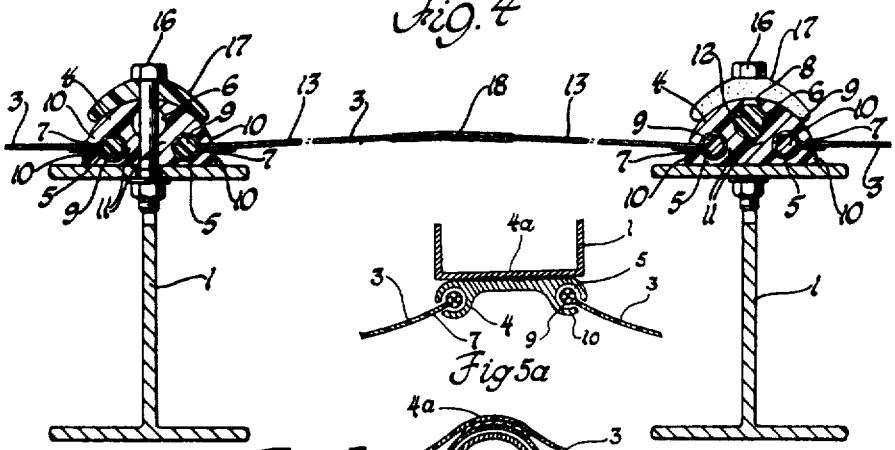
Fig 5a
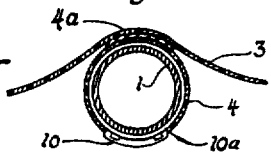
Fig. 5
Fig. 5b
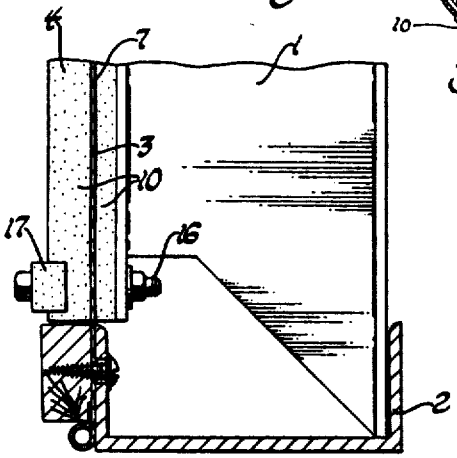
Fig. 6
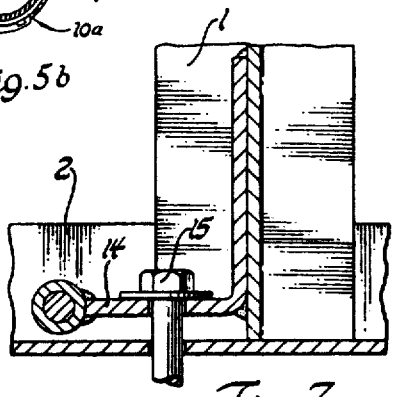
Fig. 7

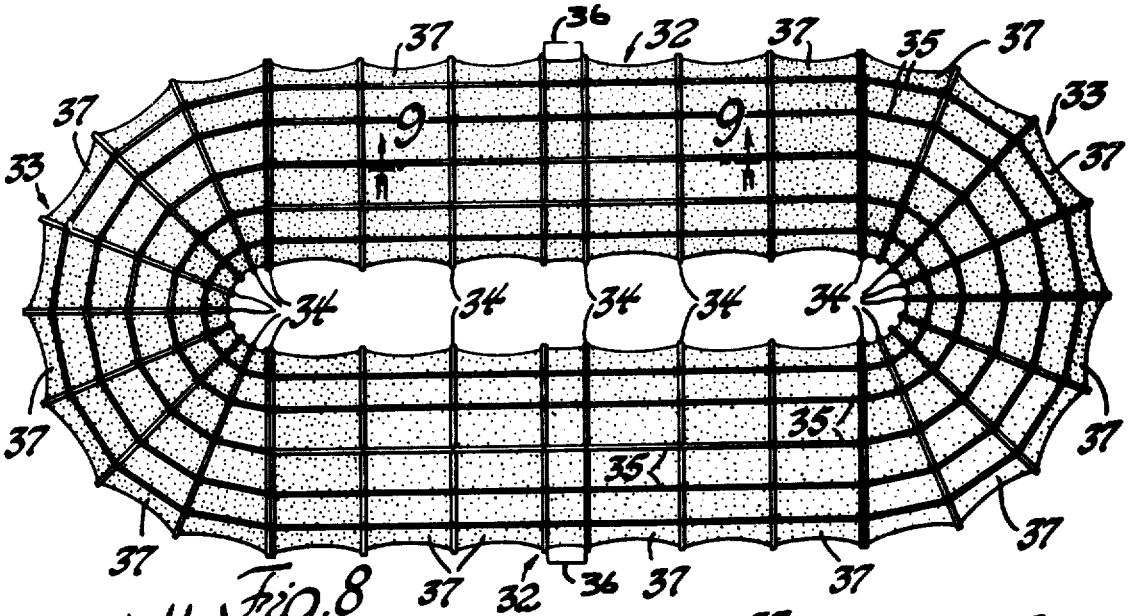
Fig. 8
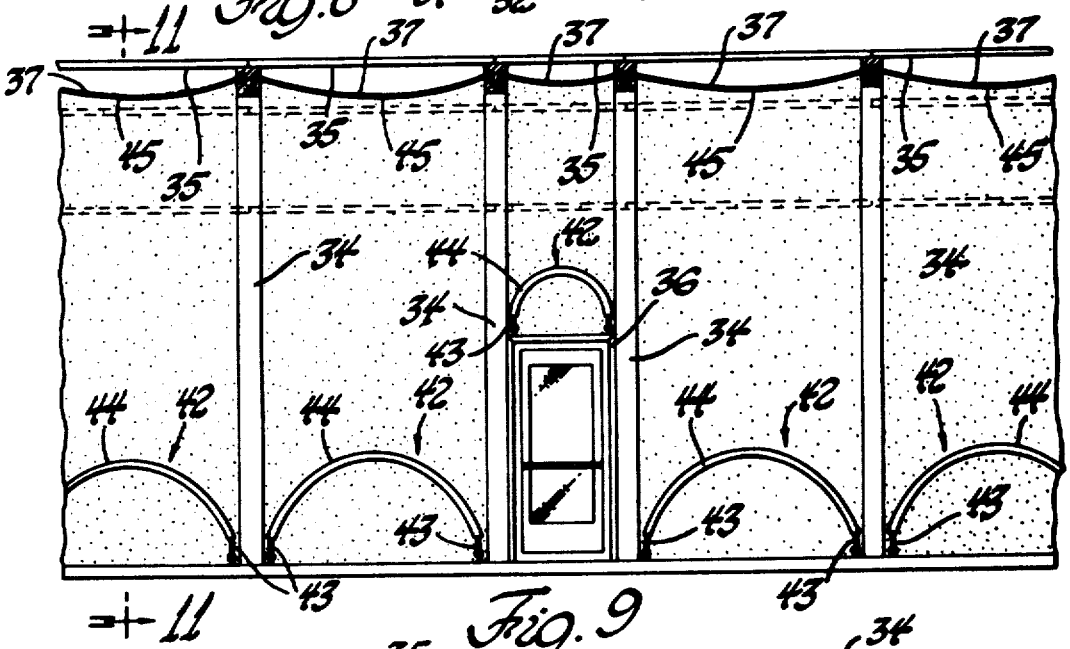
Fig. 9
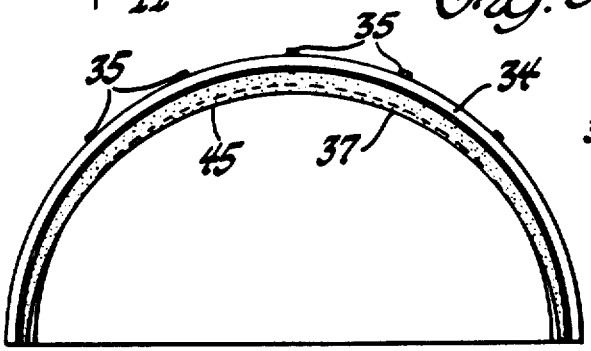
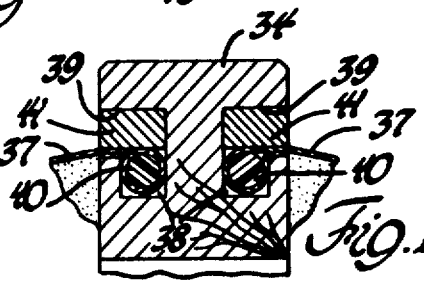
Fig. 10
Fig. 11

VERTICAL ARCH SHELTER

Matter enclosed in heavy brackets [ ] appears in the original patent but forms no part of this reissue specification; matter printed in italics indicates the additions made by reissue.

BACKGROUND OF INVENTION

This is a Continuation in Part of my application Ser. No. 339,333 filed May 8, 1973 entitled, "A Vaulted Membrane Structure", which was, in turn, a Continuation in Part of the parent application, Ser. No. 93,293 filed Nov. 27, 1970, entitled, "Pavilion with a Series of Arches and Method of Assembling and Erecting It"; both of which are now abandoned.

These applications are related to my arch supported shelter patents such as U.S. Pat. No. 3,215,153; 3,273,574; 3,820,553; 3,388,711; 3,856,029 and others that feature both inclined and vertical arch structures with highly tensioned membranes in double curvature.

SUMMARY OF INVENTION

The principal object of this invention is to provide a shelter of this type in which the tendency of the covering material and/or membrane to wrinkle and to flutter or vibrate in gusty or strong winds is minimized and the ability of the covering material to carry heavy loads of snow, ice and wind without undue strain is increased by sufficient curved depression of the tensioned covering material.

Another object of this invention is to provide a simplified membrane attachment to the arches which support it. This applies particularly to relative small structures.

Still another object of this invention is to provide a membrane that can be stretched over the arches, with the curvature between arches desired, and tensioned to the base to provide a practically wrinkle-free covering.

Another object of this invention is to provide sufficient sag or inward curvature between the arches of at least 5–10% of the distance between the arches. When the membrane is tensioned to a stiffened, wrinkle-free state, it will oppose deflection and movement of the arches and add great stability and resilient rigidity to the shelter.

BRIEF DESCRIPTION OF THE DRAWING

FIG. 4 illustrates pivotal arches with offset hinges to move the arches apart in the erected position.

FIG. 5 shows a membrane attachment to the arches in the section 5—5 in FIG. 1.

FIG. 5a shows another membrane attachment to an arch suitable for small structures.

FIG. 5b illustrates a membrane attachment to an arch for a one piece cover or for large sections that span several arches.

FIG. 6 is a section at the base of lines 6—6 in FIG. 1.

FIG. 7 is a section at a right angle to FIG. 6 through the lower end of an arch.

FIG. 8 is a top plan view of another shelter in accordance with the invention.

FIG. 9 is an enlarged view on the section line 9—9 of FIG. 8.

FIG. 10 is an enlarged view of the section of one of the arches shown in FIG. 9.

FIG. 11 is a view of the line 11—11 of FIG. 9.

DESCRIPTION OF THE PREFERRED EMBODIMENT

Figure 1:
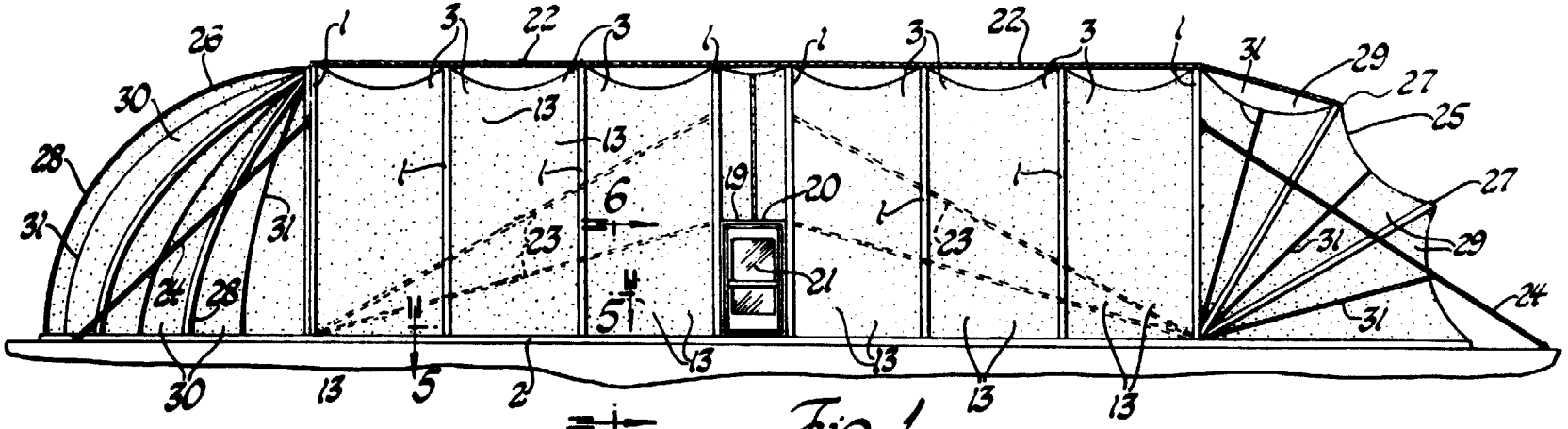
FIG. 1 is a side elevation of a vaulted structure in accordance with the invention.
Figure 2:
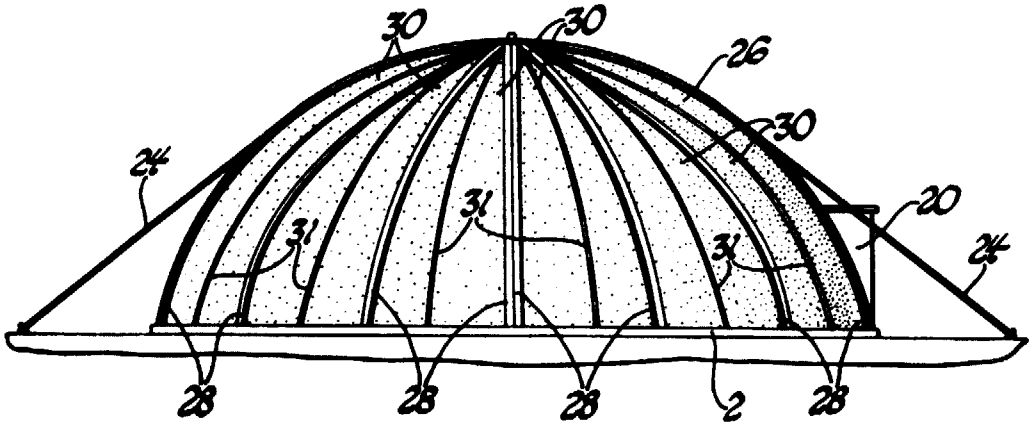
FIG. 2 is a left end elevation of FIG. 1.

The vaulted structure shown in FIGS. 1 & 2 of the drawings include a series of curved arches 1 mounted on the ground or other base 2 to serve as a frame to support a tensioned membrane 3 which extends between the arches and is operatively attached to them. The membrane usually consists of a suitable fabric, coated fabric or other flexible membrane material that is stretchable within limits and is selected to serve within its elastic limits.

When the shelter is made in modules the membrane 3 is usually made in panels that extend between the arches and is attached to them through the intermediary of a fastening means 4 such as shown in FIGS. 5, 5a, & 5b.

This fastening means 4 consists of tunnel 5 in FIG. 5 and FIG. 5a, through which a beaded edge 9 of the membrane extends with the membrane emerging through a slit 7 in the tunnel wall. In the case of FIG. 5, the fastening means 10 is made of a fairly hard rubber type material so that the slots 7 can be opened to admit the beaded edge into the tunnels 5 when tunnel 6 is empty. After the beads 9 are inserted in the tunnels 5, a filler strip is inserted in the tunnel 6 that locks the lips 7 of tunnel 5 to retain the beaded edge in the tunnel 5.

The fastening means 4 shown in FIG. 5a, is usually made of metal with fixed tunnels 5 which can be extruded in the fastener or the arch. In this case, the beaded edges 9 must be inserted in the tunnels 5 by threading the beaded edge 9 in the slot 5 by sliding the membrane 3 in the slot 7 along the arch 1 or sliding the arch along the edge of the membrane. The fastener 4 can be fastened to the arch 1 by spot welding 4a or metal fasteners. This fastener is used mostly for small structures where the arches and membranes to be attached are easy to handle.

The fastening means illustrated in FIG. 5b is adaptable when the membrane 3 is made in one piece or in large pieces that span several arches 1. The membrane 3 fits over the arches 1 and is usually attached to the arches 1 by a fastening means 4 that is in the form of a boot that enclosed the arch 1. The lacing 10 that holds boot together between grommets 10a, could be comparable to the lips 10 of the fasteners in FIG. 5 & FIG. 5a. The boot a is welded or sewn to the cover 3. The boot 4 is usually installed on the crown of the arches and extends over only 10–20% of the arch span.

The panels of covering material are made in curved trough-shaped surfaces 13 to minimize the tendency of the material to flutter and vibrate in gusty winds and to enhance its ability to carry heavy loads of snow, ice and wind without due strain. The maximum depression *or lowest point of inward curvature* of the panels between the arches is preferably at least 5–10% of the distance between the arches.

The frame of arches 1 can be erected in various ways: by pivoting the arches on the base, with or without the membrane attached; by lifting each arch individually and fixing it in space by such means as the cables 22, 23, & 24, by pivotal raising or just lifting several arches, with or without the membrane attached, to their erected position; then fixing them in place by means of the cables 24, purlins 35 by means of the membranes 25 & 26, and arches 27 & 28 of the end closures; or just by semi-arches 28 in the end closure 26.

The arches 1 can be properly spaced by moving their ends apart on the base and spacing their summits by stretching the membranes 3 to a predetermined tension, or by the use of purlins, or the cable 22. The latter can act as a safety means to prevent collapse in case of membrane failure. In any case, the arches can be properly aligned in their upright position by guys 23 connected to the middle pair of arches and to the base 2. Guys 24 are connected to the outermost arches and to the base to hold the arches apart when the membrane 3 is tensioned by pulling the membrane downward towards the base. The guys 24 can also be used to pull the arches apart to tension the membrane above the base and to align the arches. Pulling down on the arches 27 in the end closure arches on the right side of FIG. 1 can also tension the membranes 3.

Figure 3:
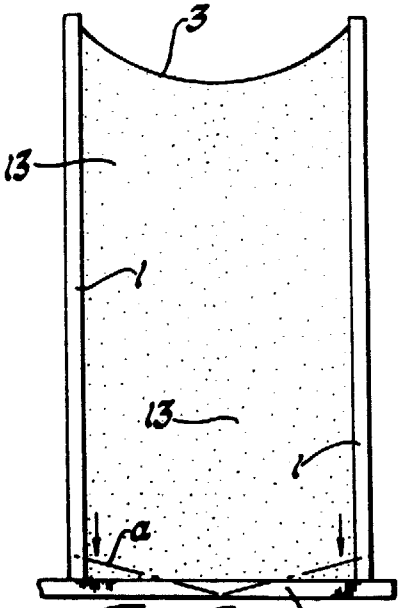
FIG. 3 illustrates one method of assembling the structure shown in FIGS. 1 and 2.

To impart a wrinkle free trough-shape to the widths of covering material in some shelters, the following expedient can be employed instead of starting with exact preformed widths:

To start with, a width of covering material of nearly rectangular, or other appropriate shape and of the length necessary to follow the contour of the arches 1 at the base of the trough and of the proper width with beads 9 in its edges is employed. This width is attached to a pair of arches 1 in the manner described. Then the edges of the width are stretched to the extent necessary to make them of the same length as the periphery of the arches by drawing their ends down to the bottoms of the legs of the arches as diagrammatically indicated in FIG. 3 in which the broken line a indicates the disposition of the lower edge of the width before the lateral edges are stretched. This may be done either by pulling the lower ends of the edges of the width to the bottoms of the legs or by anchoring the lower ends of the edges and raising the bottoms of the legs. When the lateral edges of the width have been drawn down to the bottoms of the legs of the arches, they are clamped there by bolts 16 and jaws 17. The stretching operation is illustrated as it is in FIG. 3 primarily to facilitate and simplify illustration, but it may also actually be done while the arches are in upright positions as well as when they are in recumbent positions.

In somewhat larger or medium size structures, it is much easier to tension the panels 13 between the arches by stretching the panels toward the base by the use of tension rings as shown in FIGS. 8–11. The membrane can continue under the tension ring to the base. A detachable arrangement is generally used so that the portion of the membrane below the tension ring may be raised to create an opening under the tension ring for egress, ventilation or both.

Suitable closures may be provided for one or both ends of the structure such as the accordion-like structures 25 and 26 shown in the drawing, which may be collapsed to open the ends. The closures 25 and 26 are generally similar in construction to the body of the structure in that they are made up of arches 27 in the case of the closure 25 and semi-arches 27 in the case of the closure 26 and widths 29 and 30 of flexible covering material which extend between and are attached to the arches.

However, the arches 27 of the closure 25 are mounted on the base 2 near the lower ends of one of the outermost arches 1 to swing about a horizontal axis upwardly to collapse the closure and open the end of the structure and downwardly to close it.

The summits of the semi-arches 28 of the closure 26, on the other hand, converge at the summit of the other outermost arch 1. The closure 26 is made in two halves which meet at a projection of the center line of the structure to close the end of the structure. The semi-arches are, however, mounted to swing about a vertical axis at the point of convergence of their summits to collapse each half against a leg of the end arch 1 and open the end of the structure.

Vaulted structures in accordance with my invention may be curvilinear or circular or ellipsoidal in shape instead of straight and include modules of different widths, shapes and materials.

Different means of attachment of the covering material to the arches and different methods of depressing and tensioning the flexible covering material between the arches may be also employed. A structure in which some of these and additional features are employed is illustrated in FIGS. 8–11.

The structure shown in FIGS. 8–11 is shaped like an ellipsoid or an elongated doughnut. It consists of two similar straight sections 32 disposed side by side with their ends interconnected by curved sections 33.

The sections 32 are similar in a general way to the body of the structure shown in FIGS. 1–7 and sections 33 are also generally similar except in the arches 34 converge toward their inner sides and the modules are, therefore, frusto-triangular instead of rectangular in plan. The arches 34 are kept properly spaced by purline 35. An entry or entries 36 with door or doors in them may be provided in one or more of the modules.

The arches *1 may be fixed to the base 2* may or may not be mounted to swing *or pivot* on the [ground or other] base 2 [but in either event] *and/or* they [are] may be mounted so they may be moved toward and away from each other, to facilitate the attachment of covering material 37 to the arches *and/or* to align the arches 1 and, in some cases, to adjust the tension in the membrane 13.

The arches 1 & 34 may be made of curved laminated wood, metal, composites or other material. Another method of attaching the flexible membrane panels 37 to the arches is shown in FIG. 10, where there is provided in each side of the arches, a tunnel 38 into which extends a lock slot 39 through which the beads 40 on the edges of the widths 37 may be introduced into the tunnels. To hold the beads in the tunnels there are provided lock strips 41.

After the panels of covering material are attached to the arches, one method of tensioning the panels is to move the arches apart sufficiently to take the slack out of the panels. The cables 24 may be used to hold the arches apart or the end closures 25 & 26 with their respective arches and membranes can be used to hold the arches apart. The panels 3 are then pulled downward, toward the base 2 and attached to it to maintain the tension in the membrane.

In the panels 37 of covering material employed in the structure shown in FIGS. 8–11, a means to tension and depress the panels of covering material between the arches, there is provided, near the lower edges of the panels, one or more tension rings 42 of the type disclosed in my application entitled, "Prestressed Arch Supported Membrane Shelter", Ser. No. 336,228 filed Feb. 27, 1973. Where tension rings are used there should be provided at least one tension ring for each surface 13. Each of these tension rings consists of a cable 43 which extends through an arched tunnel 44 embodied in or on the panel of covering material with its ends attached to the base 2 or to the ends of the arches 34. The cable may itself be a spring member or be attached to the base by a spring as shown in my application above identified.

In any event the cables 44 are tensioned sufficiently to draw the edges of the panels of covering material towards the base, tension the membrane widths with a depressed, intermediate portion of the panels as indicated at 45 in FIGS. 9 & 11.

The roof membrane may be attached directly to the base without an inward depression along the base if side snow loads by drifting or piling are below the membrane elastic limit. Above this area, the membrane curves transversely with the arches and inwardly between the arches longitudinally.

While such structures as this are classed as "tentage," these structures are as different from the popular tents of yesterday as day and night. Large tents were made primarily of canvas that was dimensionally sensitive to humidity which made it a constant maintainance problem. It was also comparatively weak in tensile stress—usually around 50 lbs. per inch of width. In tents, these low strength membranes only served as the roof of the shelter that vibrated and galloped in high winds to destructive states. It contributed nothing to the horizontal stability of the tent.

The membranes available today have tensile strengths of up to 30 or more times the strength of the canvas, used in the old tents, are reasonably stable in wide ranges of weather conditions and have much longer life expectancy. In these new structures, the curved membranes not only serve as strong roof and walls, but they contribute vital stability without vibration to the shelter. Wrinkle-free membranes, stiffened under high initial tension in a double curvature configuration within the lower range of their elastic limits, make these structures feasible and economical.

I claim:

1. A vaulted membrane shelter comprising at least two substantially vertical arches with curved bights mounted on a base face to face but spaced apart with means to fix said arches in space to form a vaulted framework; a tensioned flexible membrane extending between and being operatively attached to said arches by means that permits membrane tensioning movement downward along arch circumference; said membrane [being fabricated to form] *having* an inward concave curvature between the bights of said arches, [having a maximum depression of] *with a curvature depth at its lowest point that is* at least 5% of the distance between said arches, producing double curvature in said membrane *between said bights;* and means for maintaining tension in said membrane acting between the lower portion of said membrane and said base to diminish membrane vibration and increase rigidity of said shelter.

2. The shelter described in claim 1 wherein the means to fix said arches in space includes a tension member that extends between at least one vertical end arch and the base.

3. The shelter described in claim 1 wherein the means to fix said arches in space includes an end closure that is anchored to said base.

4. The shelter described in claim 1 wherein the means to fix said arches in space includes a purlin that is attached to and extends between at least two vertical arches.

5. The shelter described in claim 1 wherein the means to fix said vertical arches in space includes a safety cable that is attached to and extends between the vertical arches.

6. The shelter described in claim 1 wherein the means for maintaining tension in said membrane includes a continuous fastener such as a batten strip, a zipper or the like, whereby said membrane is attached to said base.

7. The shelter described in claim 1 wherein the means for maintaining tension in said membrane acting between said membrane and said base includes at least one tension ring comprising an arc shaped pocket embodied in the lower portion of said membrane convexly curved upward above the base that encloses a tension member which emerges and has its ends attached to: (a) the base, (b) the lower ends of said adjacent arches, and (c) a sub-base.

8. The shelter described in claim 7 wherein said roof membrane extends below said tension ring and is detachable from said base.

9. The shelter described in claim 1 wherein said membrane is operatively attached to said arches includes a sleeve or tunnel embodied in or attached to said membrane that encases said arch: (a) continuously, (b) intermittently, (c) for at least a portion of said arch crown.

10. The vaulted shelter described in claim 3 with an end closure comprising at least one arch inclined outwardly from the center of the shelter with its ends adjacent to the ends of an end vertical arch, a membrane extending between and attached to: (a) said vertical arch and said inclined arch, (b) said inclined arch and said base.

11. The vaulted shelter described in claim 1 with the addition of an end closure comprising at least one semi-arch that has one end attached to the crown of an end vertical arch and its opposite end attached to and extending between said semi-arch and said end vertical arch which is operatively attached to said base.

12. The shelter described in claim 9 wherein the membrane is operatively attached to said arches by a sleeve-like tunnel which is openable to receive and enclose said arches.

13. The shelter described in claim 1 except that said arches are mounted on a sub-base that includes a: (a) pivot means, (b) base rail, (c) segment of a base rail.

14. The shelter described in claim 11 wherein said vertical arches are interconnected by purlins or struts; said roof membrane is stretched downward over said framework and attached to (a) said base, (b) said adjacent arches by a tension ring.

15. The shelter described in claim 1 wherein said arches are fixed in space by a means that includes the membrane itself.

* * * * *